(12) United States Patent
Panchani et al.

(10) Patent No.: US 11,252,297 B2
(45) Date of Patent: *Feb. 15, 2022

(54) SYSTEM AND METHOD FOR USING A NON-CONTACT MEMORY TAG TO DETECT FRAUDULENT USE OF PRINTING DEVICES

(71) Applicant: Xerox Corporation, Norwalk, CT (US)

(72) Inventors: Rajana Mukesh Panchani, London (GB); Kenneth Schleede, Webster, NY (US); Peter Granby, Hertfordshire (GB); Patrick Wilhelmus Bernardus Gerrits, Wljchen (NL)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/196,254

(22) Filed: Mar. 9, 2021

(65) Prior Publication Data

US 2021/0281708 A1 Sep. 9, 2021

Related U.S. Application Data

(63) Continuation of application No. 16/807,670, filed on Mar. 3, 2020, now Pat. No. 10,979,594.

(51) Int. Cl.
*H04N 1/32* (2006.01)
*H04N 1/00* (2006.01)
*G06F 3/12* (2006.01)

(52) U.S. Cl.
CPC ....... *H04N 1/32138* (2013.01); *G06F 3/1203* (2013.01); *G06F 3/1225* (2013.01); *H04N 1/00342* (2013.01); *H04N 1/32673* (2013.01)

(58) Field of Classification Search
CPC .......... H04N 1/32138; H04N 1/00342; H04N 1/32673; G06F 3/1203; G06F 3/1225
See application file for complete search history.

(56) References Cited

U.S. PATENT DOCUMENTS

| | | | |
|---|---|---|---|
| 6,563,600 B1* | 5/2003 | Young | G06K 15/16 358/1.13 |
| 6,844,937 B2 | 1/2005 | Dempsey et al. | |
| 6,940,613 B1 | 9/2005 | Beard et al. | |
| 7,146,112 B2 | 12/2006 | Phipps et al. | |
| 10,979,594 B1* | 4/2021 | Panchani | G06F 3/1229 |
| 2006/0215228 A1* | 9/2006 | Inaba | H04N 1/32138 358/3.28 |
| 2019/0210395 A1* | 7/2019 | Talwerdi | B41J 13/12 |

OTHER PUBLICATIONS https://thinfilmnfc.com/solutions-nfc-solutions, last accessed Jun. 18, 2020, Thin Film Technology, San Jose, California.

* cited by examiner

*Primary Examiner* — Juan M Guillermety
(74) *Attorney, Agent, or Firm* — Simpson & Simpson, PLLC; Michael Nicholas Vranjes

(57) ABSTRACT

A method of detecting fraudulent use of a printing device including a non-contact memory tag, including receiving a request to read the tag, receiving information from the tag, determining an installed configuration of the printing device from the information, comparing the installed configuration to a current configuration of the printing device, and in response to determining that the current configuration is not the same as the installed configuration, indicating that a violation exists.

20 Claims, 4 Drawing Sheets

SYSTEM AND METHOD FOR USING A NON-CONTACT MEMORY TAG TO DETECT FRAUDULENT USE OF PRINTING DEVICES

CROSS-REFERENCE TO RELATED APPLICATIONS

This application is filed under 35 U.S.C. § 120 as a continuation of U.S. Non-Provisional patent application Ser. No. 16/807,670, filed on Mar. 3, 2020, which application is incorporated herein by reference in its entirety.

FIELD

The present disclosure relates to the field of fraud detection systems, and more particularly, to a system and method for detecting fraudulent use of printing devices using near-field communication tags/chips.

BACKGROUND

A multi-functional device (MFD) (or multi-function product/printer/peripheral (MFP), multi-functional, all-in-one (AIO)) is an office machine that incorporates the functionality of multiple devices in one, so as to have a smaller footprint in a home or small business setting, or to provide centralized document management/distribution/production in a large-office setting. A typical MFD may act as a combination of some or all of the following devices: email, facsimile, photocopier, printer, and scanner.

In the office equipment industry, such as for printers, copiers, fax machines, scanners, and MFDs, different customers have different requirements as to their business relationship with the manufacturer of the equipment or other service provider. For various reasons, some customers may wish to own their equipment outright, and take full responsibility for maintaining and servicing the equipment. On the other hand, some customers may wish to have a "hands off" approach to their equipment, wherein the equipment is leased, and the manufacturer or service provider takes the entire responsibility of keeping the equipment maintained. Other business relationships between the "owning" and "leasing" extremes may be imagined, such as a customer owning the equipment but engaging the manufacturer or service provider to maintain the equipment on a renewable contract basis.

Also in the office equipment industry, different customers have different requirements as to their equipment needs. These requirements may include the output speed of a device, for example, a MFD. Some customers may require a very fast MFD that has the capability of printing a high volume in a short amount of time, whereas some customers do not need such a fast machine. It is a common business model to manufacture a single base "platform" in hardware, and then use the software controls over the hardware to provide a set of distinctly different products. For instance, with reference to digital xerographic "laser printers," a basic hardware platform capable of outputting 40 pages per minute (ppm) can be slowed down to output pages at 30 ppm or even 20 ppm, purely by altering the control software that operates the identical hardware. Typical techniques for slowing down a basic hardware platform include simply running the various electric motors at slower speeds, or deliberately skipping an operational cycle (not feeding a print sheet, and withholding image data) for one or more of a given number of hardware cycles. The advantages of this business model include the desirability of selling different speed-rated machines at different prices, and also the ability to speed up a slowed-down machine (such as by loading in new software) should an existing customer decide he wants a faster machine. Also, in a remanufacturing environment, it is useful to be able to minimize the number of hardware configurations that must be processed.

A technical challenge in providing office equipment of a single basic hardware platform at various speeds is to deter or prevent end users (e.g., the customer or distributer/reseller) from altering the operating or output speed of a particular machine, such as to be speeded up, in an unauthorized or improper manner. Specifically, for example, it is possible for a customer to cheat the manufacturer by buying a lower speed machine (at a lower cost) and hack the non-volatile memory (NVM) therein to change the speed of the device. This fraudulent activity is detrimental to the manufacturer and is often a violation of a contract between the customer and the manufacturer, reseller, or account manager.

Therefore, there is a long felt need for a system and method for identifying such fraudulent activity by using a tag that communicates the installed configuration of the device and comparing the installed configuration to the current configuration of the device.

SUMMARY

According to aspects illustrated herein, there is provided a method of detecting fraudulent use of a printing device including a non-contact memory tag, comprising receiving a request to read the tag, receiving information from the tag, determining an installed configuration of the printing device from the information, comparing the installed configuration to a current configuration of the printing device, and in response to determining that the current configuration is not the same as the installed configuration, indicating that a violation exists.

In some embodiments, the step of determining an installed configuration of the printing device from the information comprises receiving an identification number for the printing device from the information, and communicating with a database to receive the installed configuration based on the identification number. In some embodiments, the tag is a near field communication (NFC) tag. In some embodiments, the method further comprises, in response to not determining an installed configuration of the printing device from the information, indicating that an error exists. In some embodiments, the method further comprises, in response to determining that the current configuration is not the same as the installed configuration, deactivating the printing device. In some embodiments, the method further comprises, in response to determining that the current configuration is not the same as the installed configuration, changing the current configuration to be the same as the installed configuration. In some embodiments, the step of changing the current configuration to be the same as the installed configuration comprises reprogramming a non-volatile memory (NVM) of the printing device. In some embodiments, the method further comprises determining the current configuration. In some embodiments, the step of indicating that a violation exists comprises sending a signal to a remote location.

According to aspects illustrated herein, there is provided a method of detecting fraudulent use of a printing device including a non-contact memory tag, comprising receiving, by one or more computer processors, a request to read the tag, receiving, by the one or more computer processors, information from the tag, determining, by the one or more computer processors, an installed configuration of the printing device from the information, comparing, by the one or more computer processors, the installed configuration to a current configuration of the printing device, and in response to determining that the current configuration is not the same as the installed configuration, indicating, by the one or more computer processors, that a violation exists.

According to aspects illustrated herein, there is provided a computer system for detecting fraud, comprising a printing device, comprising a non-volatile memory (NVM), a control operatively arranged to read the NVM and regulate an output speed of the printing device, and a non-contact memory tag including information, one or more computer processors comprising at least one non-contact memory tag reader, one or more computer readable storage media, program instructions stored on the computer readable storage media for execution by at least one of the one or more computer processors, the program instructions comprising program instructions to receive a request to read the non-contact memory tag, program instructions to receive information from the non-contact memory tag, program instructions to determine an installed configuration of the printing device from the information, program instructions to compare the installed configuration to a current configuration of the printing device, and program instructions to, in response to determining that the current configuration is not the same as the installed configuration, indicate a violation exists.

In some embodiments, the program instructions to determine an installed configuration of the printing device from the information comprise program instructions to receive an identification number for the printing device from the information, and program instructions to communicate with a database to receive the installed configuration based on the identification number. In some embodiments, the non-contact memory tag is a near field communication (NFC) tag. In some embodiments, the computer system further comprises program instructions to, in response to not determining an installed configuration of the printing device from the information, indicate that an error exists. In some embodiments, the computer system further comprises program instructions to, in response to determining that the current configuration is not the same as the installed configuration, deactivate the printing device. In some embodiments, the computer system further comprises program instructions to, in response to determining that the current configuration is not the same as the installed configuration, change the current configuration to be the same as the installed configuration. In some embodiments, the program instructions to change the current configuration to be the same as the installed configuration comprise program instructions to reprogram the NVM. In some embodiments, the computer system further comprises program instructions to determine the current configuration. In some embodiments, the program instructions to indicate that a violation exists comprise program instructions to send a signal to a remote location.

According to aspects illustrated herein, there is provided a computer program product for detecting fraudulent use of a printing device including a near-field communication (NFC) tag, comprising a computer readable storage medium and program instructions stored on the computer readable storage medium, the program instructions comprising program instructions to receive a request to read the NFC tag, program instructions to receive information from the NFC tag, program instructions to determine an installed configuration of the printing device from the information, program instructions to compare the installed configuration to a current configuration of the printing device, and program instructions to, in response to determining that the current configuration is not the same as the installed configuration, indicate a violation exists. In some embodiments, the program instructions to determine an installed configuration of the printing device from the information comprise program instructions to receive an identification number for the printing device from the information and program instructions to communicate with a database to receive the installed configuration based on the identification number. In some embodiments, the computer program product further comprises program instructions to, in response to not determining an installed configuration of the printing device from the information, indicate that an error exists. In some embodiments, the computer program product further comprises program instructions to, in response to determining that the current configuration is not the same as the installed configuration, deactivate the printing device. In some embodiments, the computer program product further comprises program instructions to, in response to determining that the current configuration is not the same as the installed configuration, change the current configuration to be the same as the installed configuration. In some embodiments, the program instructions to change the current configuration to be the same as the installed configuration comprise reprogramming the NVM. In some embodiments, the computer program product further comprises program instructions to determine the current configuration. In some embodiments the program instructions to indicate that a violation exists comprise program instructions to send a signal to a remote location.

According to aspects illustrated herein, there is provided a method of detecting fraudulent use of a printing device including a non-contact memory tag, comprising receiving a request to read the tag, receiving information from the tag, determining an installed configuration of the printing device from the information, comparing the installed configuration to a current configuration of the printing device, and in response to determining that the current configuration is not the same as the installed configuration, indicating that a violation exists.

According to aspects illustrated herein, there is provided a system for detecting fraud, comprising a printing device, comprising a non-volatile memory (NVM), a control operatively arranged to read the NVM and regulate an output speed of the printing device, and a near field communication (NFC) tag, and a computing device including a NFC tag reader, wherein the computing device is operatively arranged to communicate with the NFC tag to obtain an installed configuration of the printing device.

In some embodiments, the computing device is not connected to the printing device.

According to aspects illustrated herein, there is provided a system and method comprising a near field communication (NFC) tag to store the installed configuration of the MFD. An application installed on a suitable (e.g., a computing device such as a cellular telephone) is used to read the tag to retrieve the installed configuration state of the MFD, which is then compared with the current configuration of the MFD. If the current configuration is not the same as the installed configuration then a violation or fraud is communicated.

In some embodiments, a customer NFC tag would be printed or programmed for the MFD once it has been set up. In most products, the hardware is generally the same, and unique software settings are applied to determine the speed and configuration of that model. The NFC tag would be attached to the machine either on the production line by a factory worker or by the reseller that installs the machine at the customer site, the NFC tag containing the configuration details of that machine. This NFC tag would be placed in an obscure place on the MFD, which would not be visible or known to the customer. As such, the NFC tag can be placed in a variety of different locations.

If the MFD already has a NFC tag attached thereto, and the speed of the MFD is to receive an authorized speed upgrade, the reseller or manufacturer may remove the previous NFC tag prior to placing the new NFC tag. Since the NFC tag is to be hidden, this process of updating the NFC tag could be disclosed to the reseller such that the reseller knows to check for any existing NFC tag prior to placing a new NFC tag. However, if this process was not followed, then the system could indicate that there is a conflict (i.e., there is more than one NFC tag present). Subsequently, the NFC tag that does not comply with the current configuration can be removed.

A maintenance engineer or system administrator/key operator (SA/KO) would be able to check the NFC tag via an application. In some embodiments, the NFC tag would report a unique MFD identification number, the basic machine configuration details, or both.

When the NFC tag reports a unique MFD identification number (e.g., serial number), the application uses the MFD identification number to check a server database and retrieve the installed configuration details of the MFD listed therein. The application then compares the current configuration of the MFD with the installed configuration of the MFD. If the application detects a difference between the current configuration of the MFD with the installed configuration of the MFD, the application indicates a violation and the information may be automatically or manually sent back to the manufacturer/reseller by a user.

In some embodiments, a maintenance engineer or SA/KO may check multiple devices in a single room (i.e., a print room) and uses the application to read the NFC tag of each device. In such instance, multiple devices would display in the application showing the respective information for each device (e.g., serial number, a unique device identification number, installed configuration, etc.). The maintenance engineer or SA/KO may select one or more of the devices shown in the application in order to check the installed configuration and then subsequently compare the selected device to the current configuration. The current configuration may be obtained by using the user interface or display screen and checking the machine details on the device. If there is a discrepancy between the installed configuration and the current configuration, the maintenance engineer or SA/KO (i.e., user) can manually input that a conflict exists or the application may automatically do so.

An object of the present disclosure is to provide a simple, inexpensive, and robust system and method to ensures or encourage that devices maintain their originally installed configurations. The system and method allows a user to check devices for any changes in their configuration and determine if, for example, the output speed of the device has been altered (e.g., sped up).

In some embodiments, the present disclosure could be used in conjunction with other anti-fraud measures in place by the manufacturer and/or the reseller. The present disclosure is intended to be a simple implementation to provide an extra level of protection against fraudulent activity.

In some embodiments, the NFC tag could be sold as a consumable and used by the customer to track that their devices are not being tampered with.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
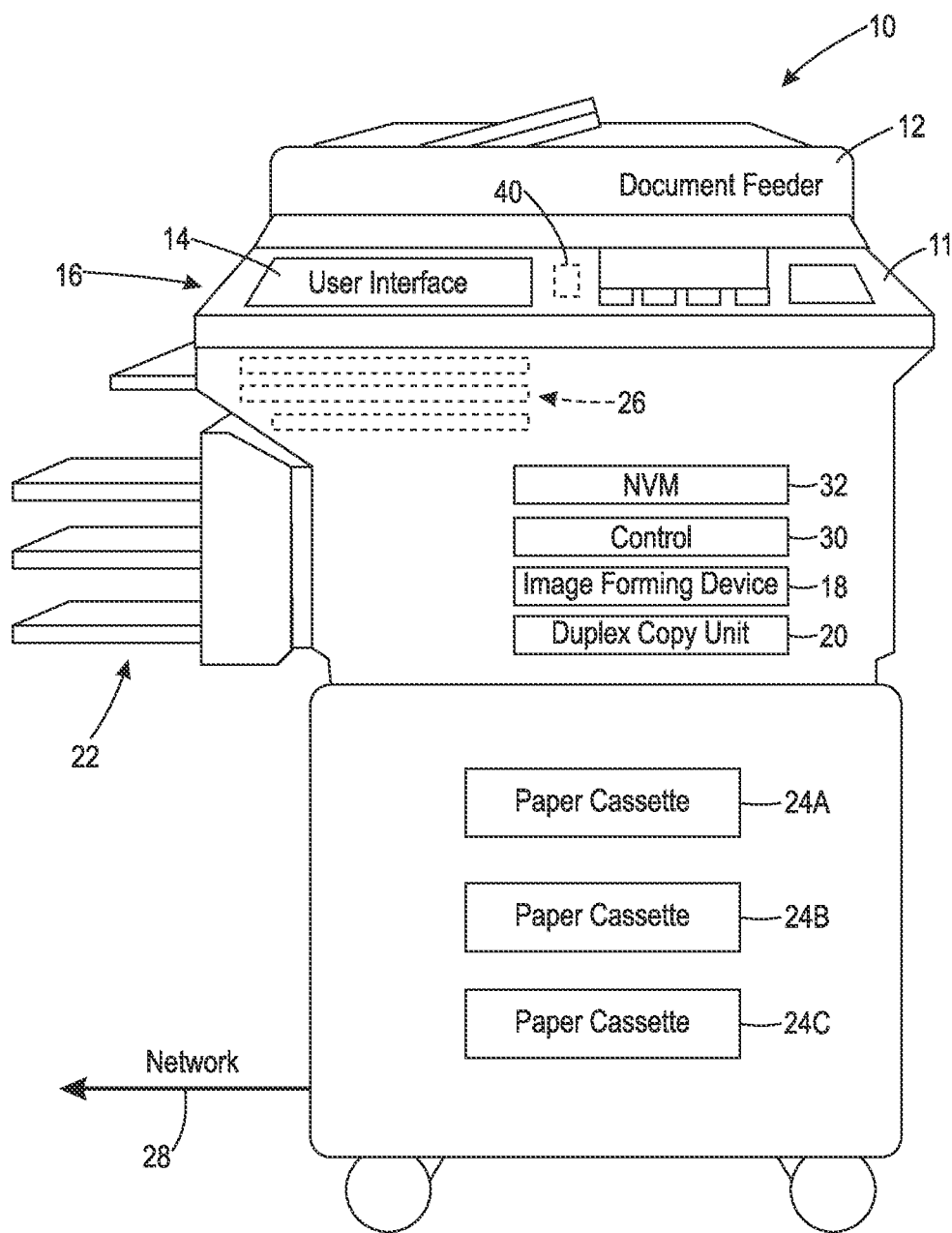
FIG. 1 is a perspective view of a printing device showing the relevant parts thereof, in accordance with some embodiments of the present disclosure.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

MFD, "printer," "printer system," "printing system," "printer device," and "printing device" as used herein encompass any apparatus, such as a digital copier, bookmaking machine, facsimile machine, multi-function machine, etc., which performs a print outputting function for any purpose. Furthermore, as used herein, "sheet," "web," "substrate," and "printable substrate" refer to, for example, paper, transparencies, parchment, film, fabric, plastic, photofinishing papers or other coated or non-coated substrate media in the form of a web upon which information or markings can be visualized and/or reproduced.

"Configuration" as used herein encompasses the configuration of software on the printing device. For example, configuration may refer to the output speed of the printing device (e.g., 40 ppm). The present disclosure mentions "installed configuration," which is used to indicate the configuration of software on the printing device at the time of installation. The present disclosure further mentions "current configuration," which is used to indicate the configuration of software on the printing device as it is currently operates. Other examples of configuration information are mentioned or suggested, for example, in the network printing environments described in U.S. Pat. No. 5,960,167 (Roberts et al.) and U.S. Pat. No. 8,953,190 (Poysa et al.), which patents are incorporated herein by reference in their entireties. It should be appreciated that configuration may also refer to the printing device model number, the printing device serial number, the toner or ink service plan of the printing device (e.g., is the toner/ink metered or sold), the purchased security options of the printing device (e.g., MCAFEE® security software), extensible interface platform (EIP) applications (e.g., XEROX® EIP applications), or any other feature or setting of the printing device that could be fraudulently altered.

Referring now to the figures, FIG. 1 is a perspective view of printing system or printing device 10 showing the relevant parts thereof, in accordance with some embodiments of the present disclosure. Printing device 10 may be a digital printing apparatus of the type suitable for use with the present disclosure. In an example embodiments, printing device 10 is a MFD or other printing device (e.g., printer, copier, scanner, facsimile, etc.) which utilizes both hardware components and software to output prints. In some embodiments, and as shown, printing device 10 comprises document feeder 12, operation (and display) panel or user interface 14, image reading device 16, image forming device 18, duplex unit 20, output device 22, one or more paper cassettes 24A-C, applications 26, control 30, non-volatile memory (NVM) 32, and tag 40. Printing device 10 may be connected to a network via network connection 28.

In some embodiments, printing device 10 may comprise one or more replaceable units. For example, printing device 10 may comprise an ink or a toner cartridge, a laser image forming apparatus, which may include an electric charging unit, a transfer unit, and a fusing unit, rollers or belts, etc. Such replaceable units often comprise a customer replaceable unit motor (CRUM) unit or tag, the CRUM unit or tag being connected to and associated with the replaceable units within printing device 10. Such CRUM unit or tag is not connected to the frame of printing device 10. The frame of printing device 10, generally indicated as frame 11, is defined herein as the structural body of printing device 10 that is not a replaceable unit. In some embodiments, tag 40 is connected to and associated with frame 11 of printing device 10, such that as replaceable units of printing device 10 are replaced, tag 40 remains unaffected.

For printing, printing device 10 communicates with control 30 to implement the printing path schedule based on one or more print orders. Printing device 10 may be capable of simplex and/or duplex output, in which a stream of images (or digital video signals representative of images) desired to be printed causes the desired images to be formed on a selected side of a print sheet.

For scanning or copying, after desired conditions have been entered on user interface 14, through the aid of a suitable display, document feeder 12 conveys a document to a predetermined reading position on image reading device 16 and, after the document has been read, drives it away from the reading position. Image reading device 16 illuminates the document brought to the reading position thereof. The resulting reflection from the document is transformed to a corresponding electric signal, or image signal, by a solid state imaging device (e.g., a Charge Coupled Device (CCD) image sensor). Image forming device, marker, or print head 18 forms an image represented by the image signal on a plain paper or a thermosensitive paper by an electrophotographic (i.e., xerographic), thermosensitive, heat transfer, ink jet or similar conventional system.

As a paper is fed from any one of paper cassettes 24A-C to image forming device 18, image forming device 18 forms an image on one side of the paper. Duplex unit 20 is operatively arranged to turn over the paper carrying the image on one side thereof and again feed it to image forming device 18. As a result, an image is formed on the other side of the paper to complete a duplex copy. Duplex unit 20 has customarily been designed to refeed the paper immediately or to sequentially refeed a plurality of papers stacked one upon the other, from the bottom paper to the top paper. The papers, or duplex copies, driven out of image forming device 18 are sequentially sorted by output device 22 in order of page or page by page.

Applications, generally 26, share document feeder 12, user interface 14, image reading device 16, image forming device 18, duplex unit 20, output device 22, paper cassettes 24A-C, control 30, and NVM 32, which are the resources built in printing device 10. The applications include a copier application, a printer application, a facsimile (Fax) application, a scanner application, and other applications.

In order to instruct control 30 to operate image forming device 18 at one possible speed or another, such as either 40 ppm or 30 ppm, there can be selectably loaded into NVM 32 a password which, when read (such as at start-up, or more often) by control 30, instructs control 30 to operate image forming device 18 at a particular speed. There may be one password to be loaded into NVM 32 for operating the image forming device 18 at 30 ppm, and another password that can be loaded into NVM 32 which, when read by control 30, instructs control 30 to operate image forming device 18 at 40 ppm. Thus, by re-programming the software saved on NVM 32 of printing device 10, the output speed of printing device 10 can be increased/decreased (i.e., by decreasing the number of skipped pitches on the printing belt or loop, increasing the speed of the motors running the loop and feeder trays, etc.). A system for enabling a printing apparatus to operate at multiple selectable speeds using the same hardware is described in U.S. Pat. No. 6,563,600 (Young), which patent is incorporated herein by reference in its entirety.

Tag 40 is non-contact memory device arranged on printing device 10. In some embodiments, tag 40 is hidden from view such that users would not know it was there unless previously instructed. Tag 40 comprises information such as, but not limited to, the originally installed configuration (e.g., the output speed) of printing device 10 (e.g., 30 ppm), a unique number associated with printing device 10 (e.g., serial number), whether printing device 10 is metered (i.e., does the customer pay by page and report the total pages printed with toner supplied by the manufacturer/reseller, or does the customer purchase toner as needed), customer information (i.e., like a customer asset tag), etc. In some embodiments, tag 40 is an NFC tag (e.g., THIN FILM™ NFC OPENSENSE™ tags) operatively arranged to communicate with a computing device (e.g., a NFC tag reader). It should be appreciated that NFC tag also includes a NFC chip, both of which are included within the scope of the present disclosure. It should also be appreciated that, while the present disclosure only illustrates the use of one tag, one or more tags may be used, for example, printing device 10 may comprise one or more NFC tags 40. In some embodiments, tag 40 is a radio-frequency identification (RFID) tag operatively arranged to communicate with a computing device. In some embodiments, tag 40 comprises information that can be read via an optical reader, for example, ultra-violet ink that is not visible to the human eye. It should be appreciated that tag 40 may comprise any suitable stored memory device that can communicate information to a device via wired or wireless connection. Some examples of non-contact memory tags are NFC tags, RFID tags, tags read via optical readers, etc.

Figure 2:
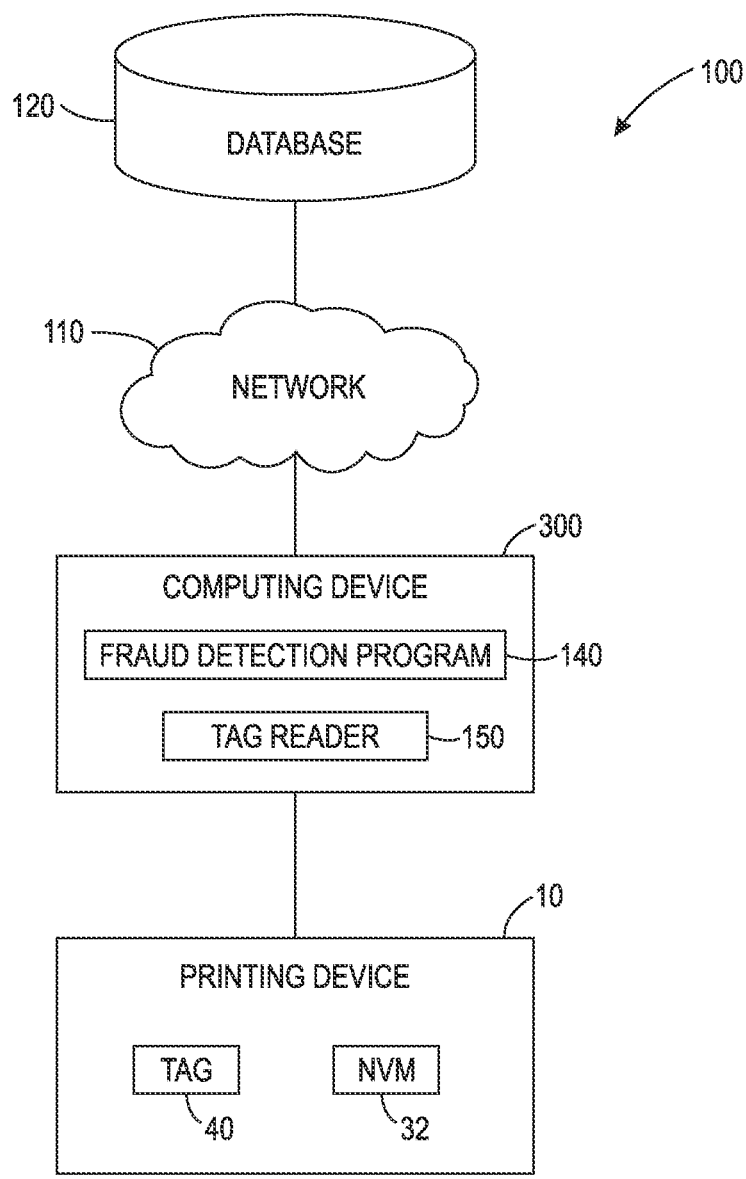
FIG. 2 is a functional block diagram illustrating an environment, in accordance with some embodiments of the present disclosure.

FIG. 2 is a functional block diagram illustrating environment 100, in accordance with some embodiments of the present disclosure. FIG. 2 provides only an illustration of one implementation, and does not imply any limitations with regard to the environments in which different embodiments may be implemented. Many modifications to the depicted environment may be made by those skilled in the art without departing from the scope of the disclosure as recited by the claims. In some embodiments, fraud detection environment 100 includes computing device 300 and database 120 all of which are connected to network 110. In some embodiments, fraud detection environment 100 further comprises printing device 10, which communicates with computing device 300 and/or fraud detection program 140 via tag reader 150, as will be described in greater detail below.

Network 110 can be, for example, a local area network (LAN), a wide area network (WAN) such as the Internet, or a combination of the two, and can include wired, wireless, or fiber optic connections.

Computing device 300 may be a hardware device that can determine whether fraudulent use of printing device 10 exists by comparing a current configuration to an installed configuration using fraud detection program 140. Computing device 300 is capable of communicating with network 110, database 120, and printing device 10 (i.e., tag 40 and NVM 32). In some embodiments, computing device 300 is a smart phone. In some embodiments, computing device 300 may include a computer. In some embodiments, computing device 300 may include internal and external hardware components, as depicted and described in further detail with respect to FIG. 4. In some embodiments, fraud detection program 140 is implemented on a web server, which may be a management server, a web server, or any other electronic device or computing system capable of receiving and sending data. The web server can represent a computing system utilizing clustered computers and components to act as a single pool of seamless resources when accessed through a network. The web server may include internal and external hardware components, as depicted and described in further detail with respect to FIG. 4.

Fraud detection program 140 receives a request from a user to determine if a printing device has been tampered with. Fraud detection program 140 can receive requests to inspect a printing device from a user. In response to the request, fraud detection program 140 reads tag 40 of printing device 10, via tag reader 150 on computing device 300, and obtains necessary information therefrom. For example, tag reader 150 reads tag 40 and fraud detection program 140 may receive installed configuration output speed. In another example, tag reader 150 reads tag 40 and fraud detection program 140 may receive a unique identification number for printing device 10 (e.g., a serial number). In such example, fraud detection program 140 then communicates with database 120 to obtain the installed configuration output speed that corresponds with the unique identification number (i.e., upon installing software on a given printing device, the installed configuration is logged in database 120). Fraud detection program 140 then compares the current configuration to the installed configuration. If the current configuration is not the same as the installed configuration (i.e., the output speed of printing device 10 has been increased), then fraud detection program 140 indicates that fraud exists. In some embodiments, fraud detection program 140 is capable of detecting the current configuration of printing device 10. In some embodiments, fraud detection program 140 receives the current configuration of printing device 10 from manual input from a user. In some embodiments, fraud detection program 140 displays the installed configuration and the user then compares the installed configuration to the current configuration. In some embodiments, if fraud exists, fraud detection program 140 is capable of writing to NVM 32 to re-program the software and set the current configuration to match that of the installed configuration (i.e., slow the output speed down). In some embodiments, if fraud exists, fraud detection program 140 initiates a code to shut down printing device 10. In some embodiments, if fraud exists, fraud detection program 140 alerts a manufacturer, reseller, or an accounts team that manages the device, at a remote location. It should be appreciated that, although shown installed on computing device 300, fraud detection program 140 and tag reader 150 may be installed within printing device 100. In such embodiments, fraud detection program 140 could be arranged to read tag 40 and detect the current configuration of printing device 10 at a predetermined period of time (e.g., once a day, once a week, every time printing device is turned on, etc.), compare such configurations, and send notifications to a remote location indicating the status of printing device 10 (i.e., is printing device 10 operating at a speed different from its intended operating speed).

Database 120 is a central storage for information related to installed configurations of printing devices. For example, database 120 may include a list of printing devices identified by their unique identification number (e.g., serial number) and the corresponding installed configuration (output speed) of each respective printing device. Database 120 can be implemented using any non-volatile storage medium known in the art. For example, authentication database can be implemented with a tape library, optical library, one or more independent hard disk drives, or multiple hard disk drives in a redundant array of independent disks (RAID). In some embodiments, database 120 receives requests for installed configurations of printing devices from fraud detection program 140. In some embodiments, database 120 resides on a server.

Figure 3:
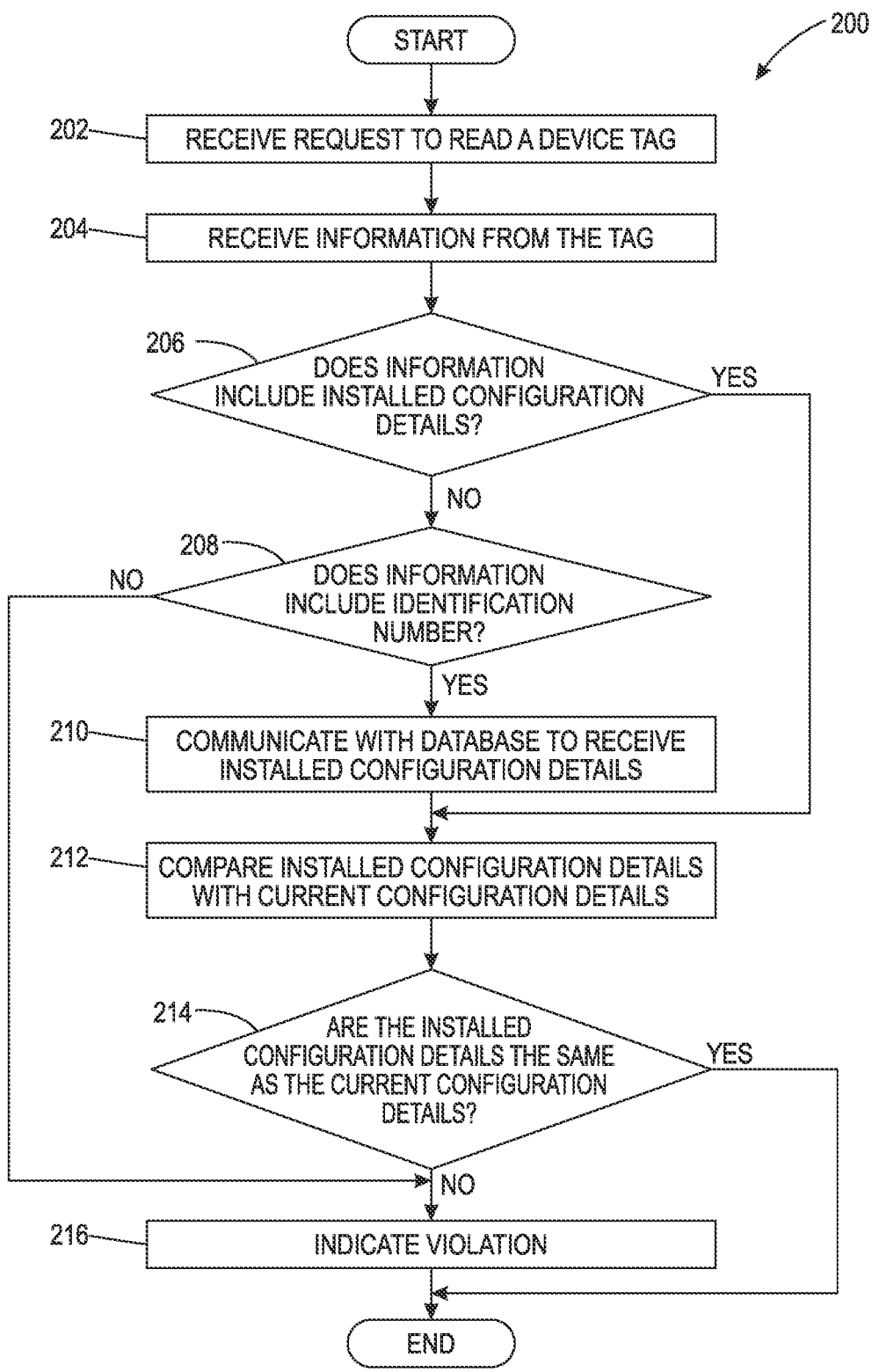
FIG. 3 is a flow chart depicting operational steps for detecting fraudulent use of a printing device, in accordance with some embodiment of the present disclosure; and, FIG. 4 is a block diagram of internal and external components of a computing system, in accordance with some embodiments of the present disclosure.

FIG. 3 shows flow chart 200 depicting operational steps for detecting fraudulent use of a printing device, in accordance with some embodiment of the present disclosure.

In step 202, fraud detection program 140 receives a request to read tag 40. In some embodiments, the request may come from a user (e.g., SA/KO, reseller, manufacturer, customer, etc.). For example, the user may initiate fraud detection program 140 on computing device 300 and, through a user interface, activate tag reader 150 thereon to read tag 40. In some embodiments, fraud detection program 140 receives a request via an automatic preprogrammed rule. For example, in the embodiments wherein fraud detection program 140 and tag reader 150 are arranged on printing device 10, as described above, upon turning printing device 10 on, fraud detection program 140 may be activated. Alternatively, fraud detection program 140 may be activated once every day or once every week, etc.

In step 204, fraud detection program 140 receives information from tag 40. As previously described, in some embodiments, tag 40 is a NFC tag operatively arranged to transmit data to NFC tag reader 150. For example, the information on tag 40 may include, inter alia, the installed configuration details (e.g., output speed) of printing device 10 or a unique identification number (e.g., serial number) for printing device 10. As is well known in the art of NFC devices, tag reader 150 is capable of communicating with or reading tag 40 when held in close proximity thereto (e.g., within 4 cm).

In step 206, fraud detection program 140 determines whether the information received from tag 40 includes the installed configuration details of printing device 10. As previously described, the installed configuration details may include, inter alia, the output speed of printing device 10 and/or details of the software originally installed on printing device 10 that controls the output speed of printing device 10 (e.g., 20 ppm, 30 ppm, 40 ppm, etc.).

If, in step 206, fraud detection program 140 determines that the information received from tag 40 does not include the installed configuration details of printing device 10, then in step 208, fraud detection program 140 determines whether the information received from tag 40 includes the unique identification number of printing device 10. As previously described, in some embodiments, the unique identification number of printing device 10 (e.g., serial number of printing device 10) is logged in database 120 along with its corresponding installed configuration details.

If, in step 208, fraud detection program 140 determines that the information does not include the unique identification number of printing device 10, then in step 216, fraud detection program 140 indicates a violation exists. A violation in this situation may exist because tag 40 is corrupted. For example, tag 40 may have been tampered with or inadvertently damaged. A violation in this situation may also exist if no tag is arranged on printing device 10, for example, tag 40 was never arranged on printing device 10 in the first place. Regardless of the reason, a violation in this situation alerts the user, reseller, manufacturer, and/or customer that there is an issue that needs to be resolved.

If, in step 208, fraud detection program 140 determines that the information does include the unique identification number of printing device 10, then in step 210, fraud detection program 140 communicates with database 120 to receive the installed configuration details of printing device 10. In some embodiments, fraud detection program 140 communicates with database 120 via network 110, as previously described. In some embodiments, database 120 is arranged on a server and fraud detection program 140 communicates with the server. In step 210, fraud detection program 140 receives the installed configuration details of printing device 10 associated with the unique identification number of printing device 10.

If, in step 206, fraud detection program 140 determines that the information includes the installed configuration details of printing device 10, then in step 212 fraud detection program 140 compares the installed configuration details of printing device 10 with the current configuration details of printing device 10. As shown in FIG. 3, once the installed configuration details of printing device 10 are received by fraud detection program 140, the method continues on to step 212. This may occur after step 206 or after step 210.

After receiving the installed configuration details of printing device 10, in step 212 fraud detection program 140 compares the installed configuration details of printing device 10 with the current configuration details of printing device 10. As previously described, fraud detection program 140 may automatically obtain the current configuration details of printing device 10, the user may manually enter the current configuration details of printing device 10 into fraud detection program 140 (e.g., through the user interface of computing device 300), or the user may manually compare the current configuration details of printing device 10 to the installed configuration details of printing device 10 (i.e., as determined by fraud detection program 140 and displayed on the user interface of computing device 300). As such, in some embodiments, step 212 further comprises the step of fraud detection program 140 receiving the current configuration details of printing device 10.

In step 214, fraud detection program 140 determines whether the installed configuration details of printing device 10 are the same as the current configuration details of printing device 10. For example, fraud detection program 140 may compare the output speed of printing device 10 as was intended upon initial installation of software thereon to the current output speed of printing device 10.

If, in step 214, fraud detection program 140 determines that the current configuration details are not the same as the installed configuration details, then in step 216 fraud detection program 140 indicates a violation exists. A violation in this situation may exist because the software on printing device 10 has been changed or hacked, for example, reprogramming NVM 32 to change the output speed of printing device 10 (e.g., NVM 32 has been reprogrammed to change the output speed of printing device from 20 ppm to 60 ppm, or from 40 ppm to 30 ppm). As previously described, unauthorized tampering with the output speed of printing device 10 may be a violation of an account contract. In some embodiments, fraud detection program 140 indicates the violation to the user via a user interface on computing device 300. In some embodiments, fraud detection program 140 sends a signal to a remote location indicating the violation. In some embodiments, the user determines that the violation exists and manually enters the existence of a violation into fraud detection program 140 (e.g., through the user interface on computing device 300).

In some embodiments, fraud detection program 140 may, upon determining that a violation exists in step 216, reprogram NVM 32 such that the current configuration output speed of printing device 10 is the same as the originally installed configuration output speed of printing device 10. For example, if, in step 216, fraud detection device 140 determines that the output speed of printing device 10 is 40 ppm and it should be 30 ppm, fraud detection device 140 resets the programming of printing device 10 such that the output speed is 30 ppm. The reprogramming of the software of printing device 10 can include any suitable method known to those having ordinary skill in the art. In some embodiments, fraud detection program 140 is operatively arranged to reprogram the software of printing device 10 automatically through wired or wireless connection between computing device 300 and printing device 10. In some embodiments, printing device 10 is reprogrammed manually by a user.

Further, in some embodiments fraud detection program 140 may, upon determining that a violation exists in step 216, disable (i.e., deactivate, shut down, etc.) printing device 10 and suspend further operation thereof until the violation is addressed. For example, fraud detection program 140 or the user may disable printing device 10 until printing device 10 is reprogrammed with the proper output speed.

Figure 4:
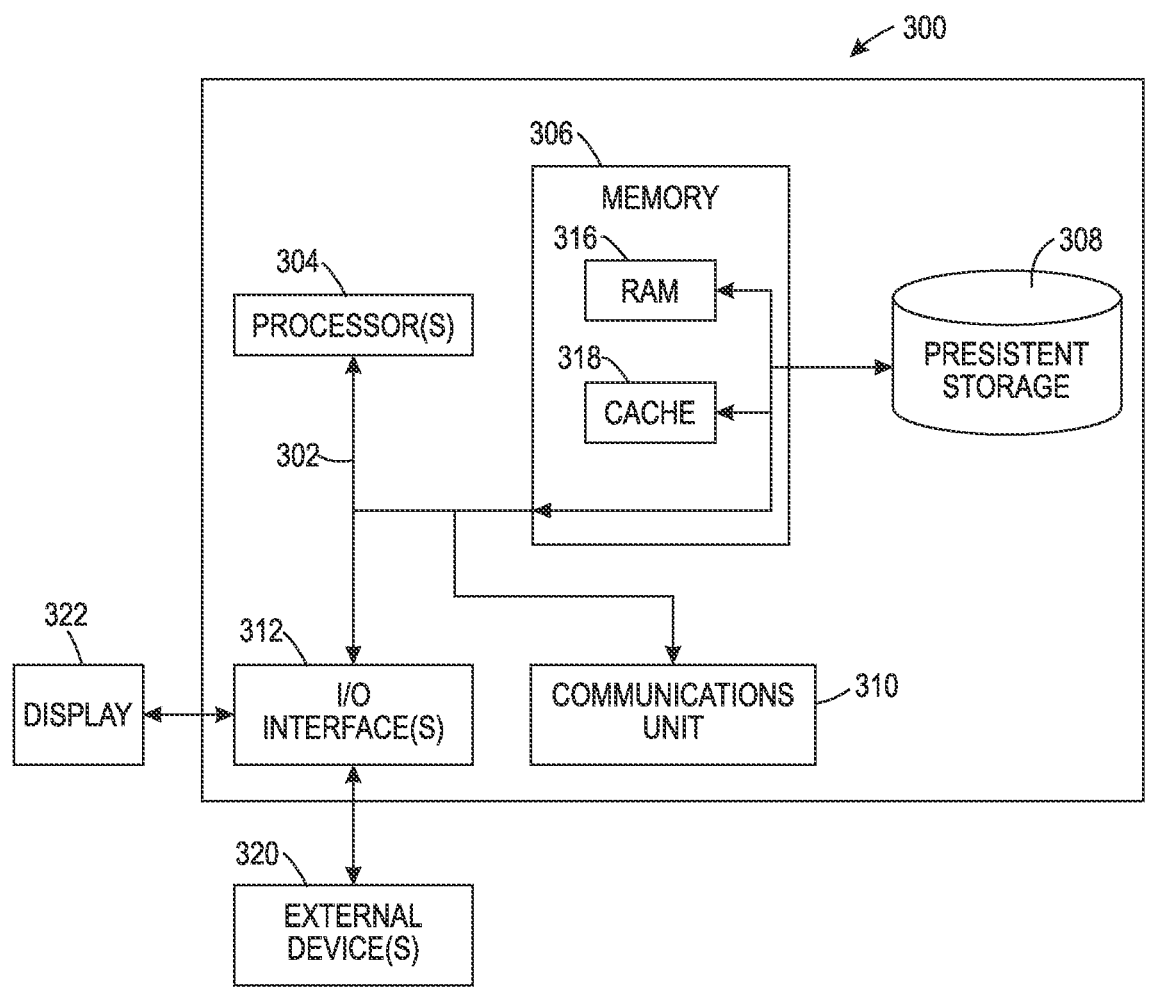

FIG. 4 is a block diagram of internal and external components of computing system 300, which is representative of the computing device of FIG. 2, in accordance with an embodiment of the present disclosure. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present disclosure can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computer readable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 Printing device
11 Frame
12 Document feeder
14 User interface
16 Image reading device
18 Image forming device
20 Duplex unit
22 Output device
24A Paper cassette
24B Paper cassette
24C Paper cassette
26 Applications
28 Network connection
30 Control
32 Non-volatile memory (NVM)
40 Tag (NFC tag)
100 Fraud detection environment
110 Network
120 Database
140 Fraud detection program
150 Tag reader
200 Flow chart
202 Step
204 Step
206 Step
208 Step
210 Step
212 Step
214 Step
216 Step
300 Computing device
302 Communications fabric
304 Processing units
306 Memory
308 Persistent storage
310 Communications unit
312 Input/output (I/O) interfaces
316 Random access memory (RAM)
318 Cache memory
320 External device(s)
322 Display

What is claimed is:

1. A method of detecting fraudulent use of a printing device including a non-contact memory tag, comprising:
receiving a request to read the tag;
receiving information from the tag;
determining an installed configuration of the printing device from the information;
comparing the installed configuration to a current configuration of the printing device; and,
in response to determining that the current configuration is not the same as the installed configuration, indicating that a violation exists.

2. The method as recited in claim 1, wherein the step of determining an installed configuration of the printing device from the information comprises:
receiving an identification number for the printing device from the information; and,
communicating with a database to receive the installed configuration based on the identification number.

3. The method as recited in claim 1, wherein the tag is a near field communication (NFC) tag.

4. The method as recited in claim 1, further comprising:
in response to not determining an installed configuration of the printing device from the information, indicating that an error exists.

5. The method as recited in claim 1, further comprising:
in response to determining that the current configuration is not the same as the installed configuration, deactivating the printing device.

6. The method as recited in claim 1, further comprising:
in response to determining that the current configuration is not the same as the installed configuration, changing the current configuration to be the same as the installed configuration.

7. The method as recited in claim 6, wherein the step of changing the current configuration to be the same as the installed configuration comprises:
reprogramming a non-volatile memory (NVM) of the printing device.

8. The method as recited in claim 1, further comprising:
determining the current configuration.

9. The method as recited in claim 1, wherein the step of indicating that a violation exists comprises:
sending a signal to a remote location.

10. A computer system for detecting fraud, comprising:
a printing device, comprising:
a non-volatile memory (NVM);
a control operatively arranged to read the NVM and regulate an output speed of the printing device; and,
a non-contact memory tag including information;
one or more computer processors comprising at least one non-contact memory tag reader;
one or more computer readable storage media;
program instructions stored on the computer readable storage media for execution by at least one of the one or more computer processors, the program instructions comprising:
program instructions to receive a request to read the non-contact memory tag;
program instructions to receive information from the non-contact memory tag;
program instructions to determine an installed configuration of the printing device from the information;
program instructions to compare the installed configuration to a current configuration of the printing device; and,
program instructions to, in response to determining that the current configuration is not the same as the installed configuration, indicate a violation exists.

11. The computer system as recited in claim 10, wherein the program instructions to determine an installed configuration of the printing device from the information comprise:
program instructions to receive an identification number for the printing device from the information; and,
program instructions to communicate with a database to receive the installed configuration based on the identification number.

12. The computer system as recited in claim 10, wherein:
the non-contact memory tag is a near field communication (NFC) tag.

13. The computer system as recited in claim 10, further comprising:

program instructions to, in response to not determining an installed configuration of the printing device from the information, indicate that an error exists.

14. The computer system as recited in claim 10, further comprising:
program instructions to, in response to determining that the current configuration is not the same as the installed configuration, deactivate the printing device.

15. The computer system as recited in claim 10, further comprising:
program instructions to, in response to determining that the current configuration is not the same as the installed configuration, change the current configuration to be the same as the installed configuration.

16. The computer system as recited in claim 15, wherein the program instructions to change the current configuration to be the same as the installed configuration comprise:
program instructions to reprogram the NVM.

17. The computer system as recited in claim 10, further comprising:
program instructions to determine the current configuration.

18. The computer system as recited in claim 10, wherein the program instructions to indicate that a violation exists comprise:
program instructions to send a signal to a remote location.

19. A system for detecting fraud, comprising:
a printing device, comprising:
  a non-volatile memory (NVM);
  a control operatively arranged to read the NVM and regulate an output speed of the printing device; and,
  a near field communication (NFC) tag; and,
a computing device including a NFC tag reader, wherein the computing device is operatively arranged to communicate with the NFC tag to obtain an installed configuration of the printing device.

20. The system as recited in claim 19, wherein the computing device is not connected to the printing device.

* * * * *